May 20, 1958  B. O. SPARKS  2,835,468
VALVE CONSTRUCTION
Filed Feb. 13, 1956

INVENTOR,
Brian O. Sparks
BY
ATTORNEY.

United States Patent Office 2,835,468
Patented May 20, 1958

2,835,468

VALVE CONSTRUCTION

Brian O. Sparks, Long Beach, Calif., assignor to Clary Corporation, San Gabriel, Calif., a corporation of California Application February 13, 1956, Serial No. 565,175

3 Claims. (Cl. 251—129)

This invention relates to valves and has particular reference to fluid control valves of the gate type.

A principal object of the present invention is to provide a simple and economical fluid control valve which is inexpensive to manufacture and which requires a minimum amount of force and travel to be applied to an actuating device therefor.

Another object of the invention is to provide a fluid control valve whose fluid sealing ability increases with the increase in fluid pressure.

Another object of the invention is to provide a fluid control valve which permits a straight line flow of fluid therethrough.

The manner in which the above and other objects of the invention are accomplished will be readily understood on reference to the following specification when read in conjunction with the accompanying drawings, wherein.

Figures 1, 2:
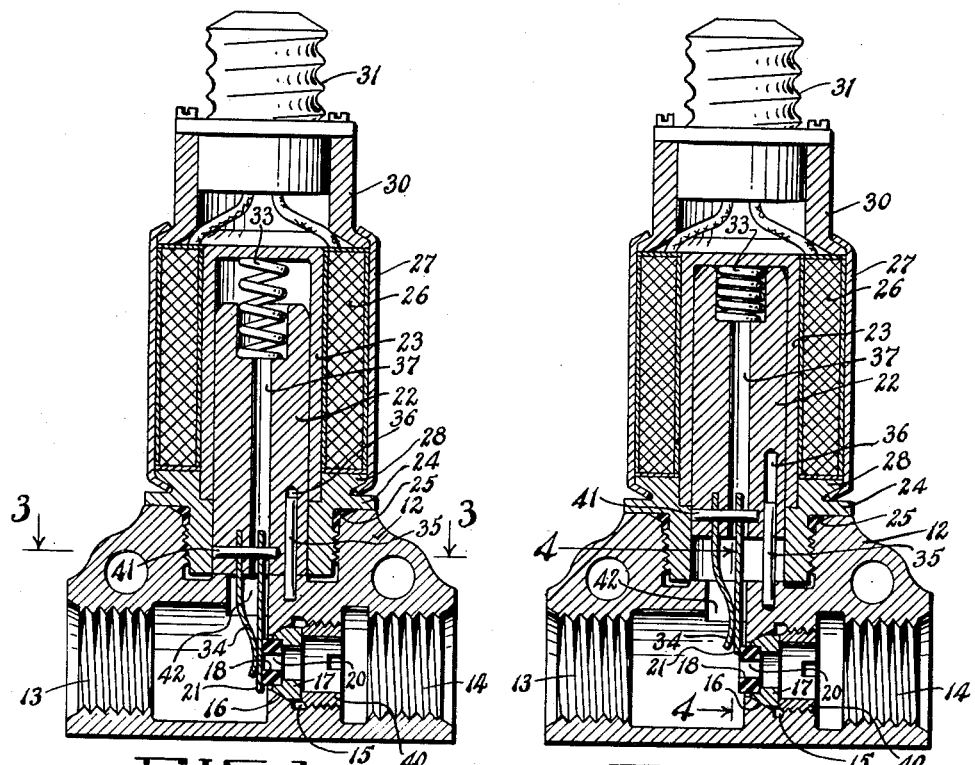
Fig. 1 is a longitudinal sectional view through a valve embodying the present invention and illustrating the same in closed condition.
Fig. 2 is a view similar to that shown in Fig. 1, illustrating the valve in an open condition.
Figure 3:
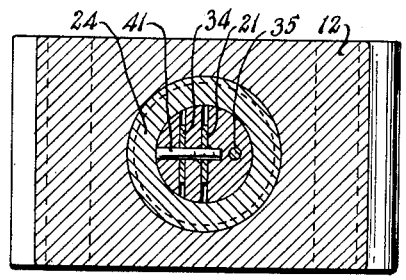
Fig. 3 is a sectional plan view of the valve and is taken along the line 3—3 of Fig. 1.

Referring in particular to Figs. 1 to 4, inclusive, the valve comprises a valve casing 12 having a threaded inlet port 13 and a threaded outlet port 14 for attachment to suitable threaded tubing connections (not shown) whereby to transmit fluid to and from the valve. It will be noted that the ports 13 and 14 extend coaxially of each other.

The valve casing has a threaded passage 15 therein communicating the inlet and outlet ports 13 and 14, respectively, and extending coaxially therewith. The passage forms a conical shoulder 16 to receive a valve seat bushing 17 having a mating conical surface thereon. The bushing 17 is recessed to receive a tubular valve seat 18 suitably bonded or otherwise secured thereto. The valve seat 18 is formed of rubber or other relatively soft flexible material and the opening or passage 20 therein is oblong in cross section as shown particularly in Fig. 4. A tubular retainer member 40 is threadably secured in the passage 15 to removably hold the valve seat bushing 17 in place.

The valve element comprises a thin flexible strip 21, preferably of metal, which is slideable over the end face of the valve seat 18 and is fitted at the upper end thereof in a slot formed in the lower end of a plunger 22. A pin 41 extending through the plunger and strip 21, holds the latter in place.

The plunger, which is preferably of ferrous material, is slideably mounted in a hollow core member 23 which is suitably secured in fluid tight relation to a connector piece 24. The latter is threadably secured to the valve casing 12. An annular gasket 25 is interposed between the top of the casing 12 and the connector to form a fluid tight seal.

A solenoid coil 26 is fitted over the core piece 23 and is enclosed by a shell 27 which is coined, at its lower end, over a conical head formation 28 on the connector piece 24.

The shell 27 is likewise coined over the lower flanged portion of an electric connector socket support 30 to which is secured a suitable electric connector socket 31. The contacts (not shown) of the latter is electrically connected to the coil 26 to transmit electric current thereto.

A compression spring 33 is fitted in a pocket formed in the plunger 22 and extends between the latter and the top of the core 23 whereby to normally maintain the valve in its closed position shown in Fig. 1, wherein the valve element 21 completely covers the passage 20 to seal the same.

A leaf spring 34 is provided to resiliently urge the valve element 21 against the valve seat. The spring 34 is secured at its upper end in a second slot formed in the lower end of the plunger 22 and is held in place by the pin 41.

Means are provided to guide the plunger 22 against rotation whereby to maintain the valve element 21 in proper sliding engagement with the valve seat 18. For this purpose, a guide pin 35 is secured to the casing 12 and is slideably fitted within a hole 36 formed in the plunger.

A passage 37 formed in the plunger 22 communicates the upper end thereof with a passage 42 formed in the casing 12 and leading to the inlet port 13 whereby to permit the removal of fluid from the upper end of the plunger when the latter is drawn upwardly by the solenoid coil 26. Upon deenergization of the solenoid, the spring 33 will return the valve to closed condition.

Figure 4:
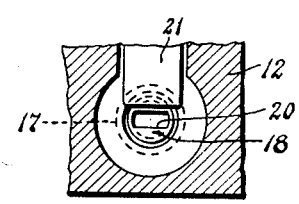
Fig. 4 is a fragmentary sectional view taken along the line 4—4 of Fig. 2.

In order to open the valve, current is fed through the solenoid coil 26, and the magnetic interaction between the coil and the plunger 22 will be effective to raise the latter against the action of the spring 33 to cause the valve element 21 to uncover the passage 20 as is shown in Figs. 2 and 4. Due to the oblong shape of the passage 20, the travel of the plunger 22 and valve element may be reduced to a minimum.

Figure 5:
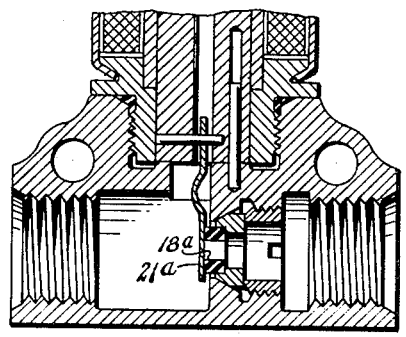
Fig. 5 is a sectional view, similar to that shown in Fig. 1, with parts broken away and illustrating a modified form of the invention.

Fig. 5 illustrates a modified form in which the leaf spring 34 of Fig. 1 is omitted and instead the spring 21a is stressed so as to maintain a constant pressure against the end face of the valve seat 18a.

Although I have described my invention in detail and have therefore used certain specific terms and language herein, it is to be understood that this disclosure is illustrative rather than restrictive and that changes and modifications may be resorted to without departing from the spirit or scope of the claims appended hereto.

Having thus described the invention, what I desire to secure by United States Letters Patent is:

1. A fluid control valve comprising a valve casing having aligned inlet and outlet ports and an opening communicating said ports, means forming a valve seat surrounding said opening, a tubular guide supported by said casing, a plunger of magnetic material slideable in said guide and movable toward and away from said seat, a thin flexible valve member carried at one end thereof by said plunger and movable adjacent the opposite end thereof over said seat, said valve member being located up stream from said seat, a spring member supported wholly at one end thereof by said plunger and engaging at its opposite end said valve member whereby to urge said valve member against said seat, and an electromagnetic coil surrounding said guide and effective upon energization thereof to move said plunger whereby to move said valve member over said seat.

2. A fluid control valve comprising a one piece valve casing having aligned inlet and outlet ports and an opening communicating said ports, means forming a valve seat surrounding said opening, a tubular guide removably attached to said casing, a plunger of magnetic material slideable in said guide and movable toward and away from said seat, a thin flexible valve member carried at one end thereof by said plunger and movable adjacent the opposite end thereof over said seat, said valve member being located up stream from said seat, a spring member supported wholly at one end thereof by said plunger and engaging at its opposite end said valve member whereby to urge said valve member against said seat, and an electromagnetic coil surrounding said guide and effective upon energization thereof to move said plunger whereby to move said valve member over said seat.

3. A fluid control valve comprising a one piece valve casing having aligned inlet and outlet ports and an opening communicating said ports, a tubular member of relatively soft flexible material in said opening forming a valve seat at one end thereof, a tubular guide removably attached to said casing, a plunger of magnetic material slideable in said guide and movable toward and away from said seat, a thin flexible valve member carried at one end thereof by said plunger and movable adjacent the opposite end thereof over said seat, said valve member being located up stream from said seat, a spring member supported wholly at one end thereof by said plunger and engaging at its opposite end said valve member whereby to urge said valve member against said seat, and an electromagnetic coil surrounding said guide and effective upon energization thereof to move said plunger whereby to move said valve member over said seat.

References Cited in the file of this patent

UNITED STATES PATENTS

| | | |
|---|---|---|
| 601,923 | Williams | Apr. 5, 1898 |
| 806,901 | Mendenhall | Dec. 12, 1905 |
| 973,606 | Worley | Oct. 25, 1910 |
| 1,653,986 | Clarke | Dec. 27, 1927 |
| 1,751,122 | Barker | Mar. 18, 1930 |
| 1,822,668 | Protzeiler | Sept. 8, 1931 |
| 2,735,047 | Garner | Feb. 14, 1956 |

FOREIGN PATENTS

| | | |
|---|---|---|
| 34,281 | Denmark | Mar. 6, 1925 |